F. D. COOLEY.
CONVERTER.
APPLICATION FILED JULY 15, 1918.

1,310,178.

Patented July 15, 1919.
2 SHEETS—SHEET 1.

Witness

Inventor
FREDERICK D. COOLEY.
By Raymond A. Parker
Attorney

F. D. COOLEY.
CONVERTER.
APPLICATION FILED JULY 15, 1918.

1,310,178.

Patented July 15, 1919.
2 SHEETS—SHEET 2.

Frederick D. Cooley.

UNITED STATES PATENT OFFICE.

FREDERICK D. COOLEY, OF DETROIT, MICHIGAN.

CONVERTER.

1,310,178.　　　　Specification of Letters Patent.　　Patented July 15, 1919.

Application filed July 15, 1918. Serial No. 244,901.

*To all whom it may concern:*

Be it known that I, FREDERICK D. COOLEY, a citizen of the United States, residing at Detroit, county of Wayne, State of Michigan, have invented a certain new and useful Improvement in Converters, and declare the following to be a full, clear, and exact description of the same, such as will enable others skilled in the art to which it pertains to make and use the same, reference being had to the accompanying drawings, which form a part of this specification.

My invention relates to an apparatus for transforming a direct current into an alternating current and an object of my improvements is to provide an apparatus for this purpose embodying various improvements and among these an arrangement that shall prevent injurious arcing at the brushes.

I secure this object in the device illustrated in the accompanying drawings in which.

$a$ is a motor and $b$ is a transformer. $c$ is a binding post through which a direct current from any source of current not shown is supplied to the apparatus. $e$ is a commutator having two conductor bars $e^2$ and $e^3$ extending each for about 90 degrees, and separated by insulation also extending about 90 degrees, of the circumference of the commutator. $d$ is one brush engaging the surface of the commutator $e$, and $k$ is a brush engaging said commutator on the opposite side thereof to the brush $d$. $f$ and $j$ are continuous collector rings concentric and adjacent to the commutator $e$.

The commutator $e$ and collector rings $f$ and $j$ are secured upon the shaft of the motor $a$ so as to turn therewith.

The commutator bar $e^2$ is permanently connected by a conductor $d^2$ with the collector ring $f$ and the commutator bar $e^3$ is permanently connected with the collector ring $j$ by a conductor $k^4$. The collector ring $f$ is connected through a brush $g$ and a conductor $g^2$ with one end of the primary $p$ of a transformer $b$ and the colector ring $j$ is connected by a conductor $h^2$ through a brush $h$ with the other end of the primary $p$.

$s$ is the secondary of the transformer $b$ and $w$ is the outer or working circuit which may contain a number of annunciators or other devices.

The brush $k$ is connected by a conductor $k^2$ to the return circuit $m$.

$a^4$ is the commutator of the direct current motor $a$. $a^2$ is one of the motor brushes and $a^3$ is the other. $c^3$ is a conductor leading from the intake main $c$ to a brush $a^2$ and $k^3$ is a conductor leading from the brush $a^3$ to the return circuit $m$. Thus, it will be seen that the motor $a$ is shunted across the main line and in parallel with the commutator $e$.

Figure 1:
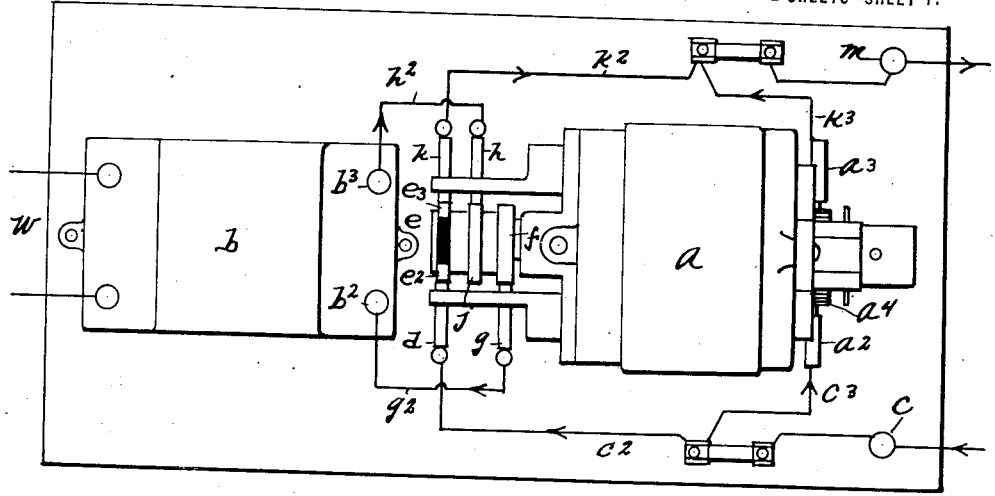
Figure 1 is a plan view of an apparatus embodying my invention.
Figure 2:
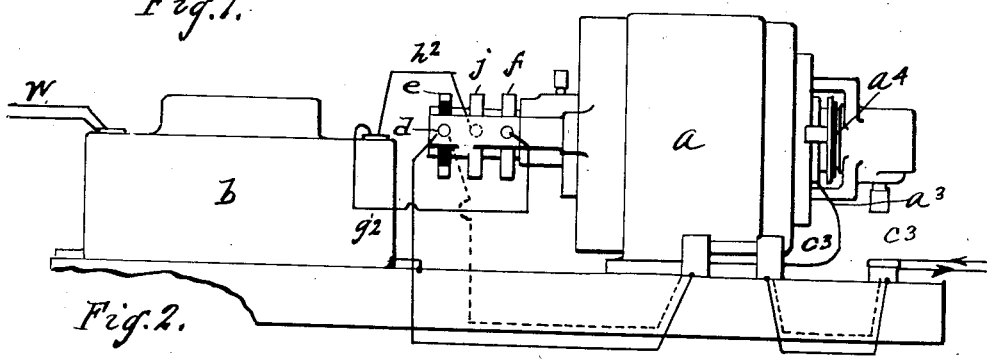
Fig. 2 is a side view of the same.
Figure 3:
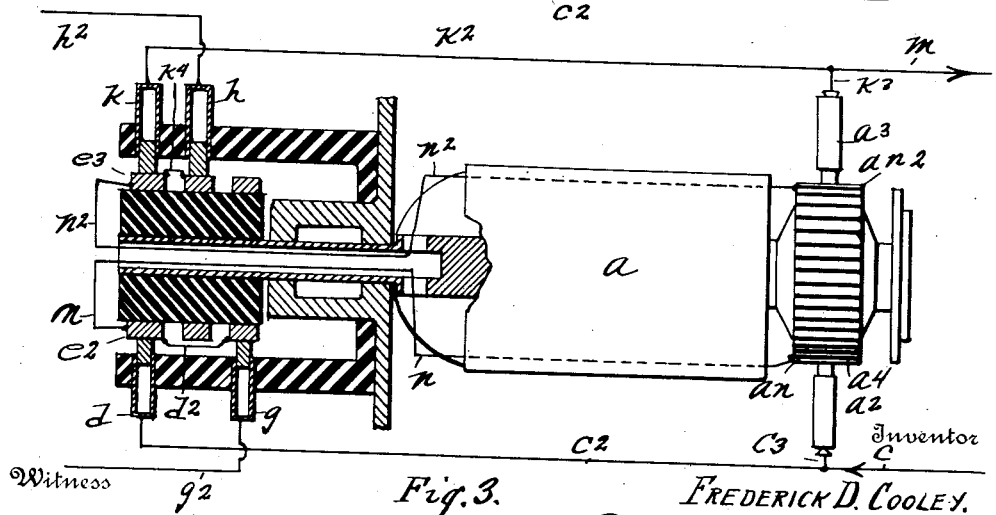
Fig. 3 is a plan view of a portion of the apparatus shown in Figs. 1 and 2, partly in section and to a larger scale.
Figure 4:
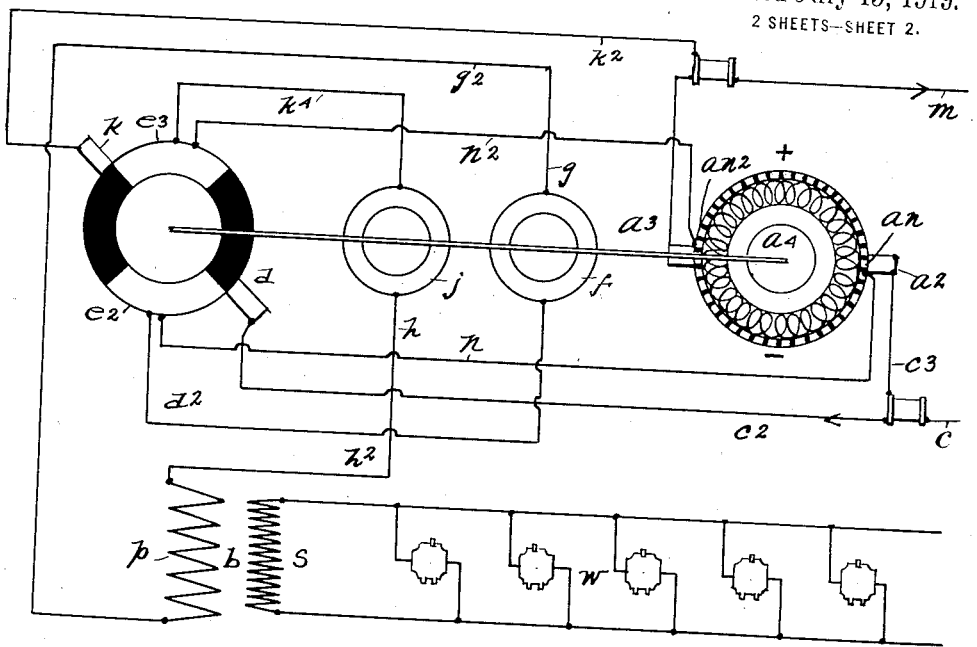
Fig. 4 is a diagram representing the various circuits in one position of the commutating apparatus.

The commutator bar $e^2$ is permanently connected by a conductor $n^2$ passing through the shaft of the motor and through grooves in the motor armature as shown in Fig. 3 with a commutator bar $an$ of the motor and the commutator bar $e^3$ is permanently connected with a commutator bar $an^2$ of the motor by a conductor $n^2$. The bars of the motor-commutator $an$ and $an^2$ are so located that they shall be in contact with the brushes $a^2$ and $a^3$ respectively when the brushes $d$ and $k$ are leaving the commutator bars $e^2$ $e^3$ as shown in Fig. 4.

Figure 5:
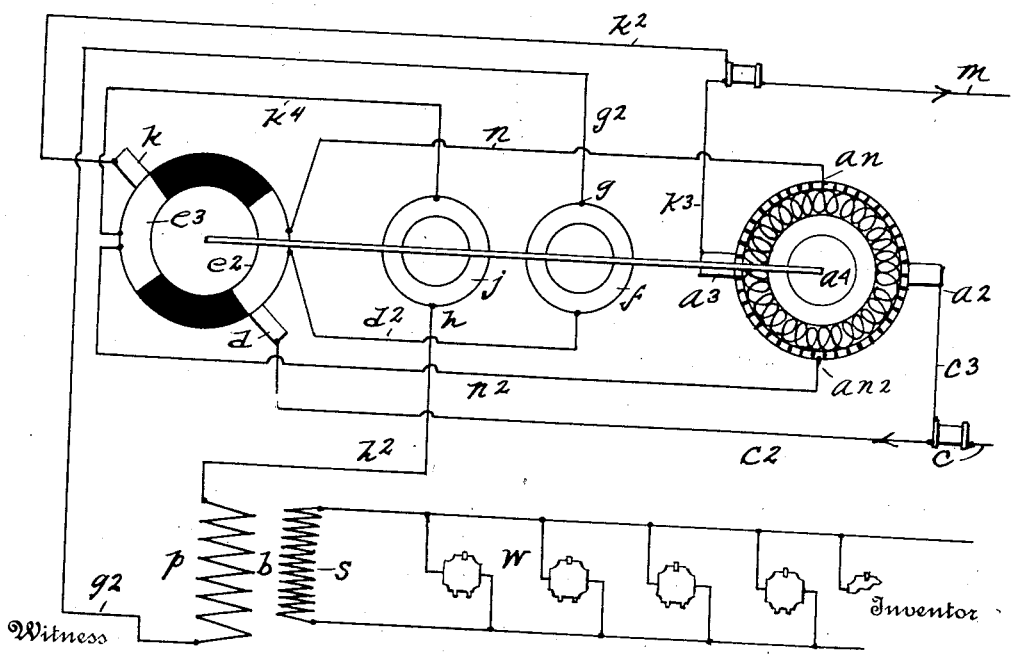
Fig. 5 is a view similar to Fig. 4, the parts being in a different position.

The operation of the above described apparatus is as follows:

Direct current is received through the binding post $c$ and is conveyed to the brush $d$ through the conductor $c^2$ and by the branch conductor $c^3$ to the motor $a$, said motor thus receiving a continuous current is set in rapid uniform rotation. The rotation of the armature of the motor $a$ brings the commutator bars $e^2$ and $e^3$ alternately into contact with the brushes $d$ and $k$ when the bar $e^2$ is in contact with the brush $d$ and the bar $e^3$ in contact with the brush $k$, as shown in Fig. 5, the circuit is as follows: The current enters at $c$ passes through $c^2$ to $d$ then to the commutator bar $e^2$ then through the permanently connected conductor $d^2$ to the collector ring $f$, to the brush $g$ and through the conductor $g^2$ to the primary $p$ of the transformer, then through the conductor $h^2$ to the brush $h$, to the collector ring $j$ through the permanent connection $k^4$ to the commutator bar $e^3$ to the brush $k$ and through the conductor $k^2$ to the return circuit $m$.

When the commutator bar $e^2$ is in contact with the brush $k$ and $e^3$ in contact with the brush $d$ the direction of the current through the primary $p$ will obviously be reversed.

Thus the direct current from the source of supply will be sent through the primary $p$ of the transformer in alternating impulses as the commutator $e$ is rotated with the armature of the motor $a$.

When the brushes $d$ and $k$ are leaving the commutator bars $e^2$ and $e^3$, if no provision was made to the contrary, an injurious arcing would occur. To prevent this, I connect the bars $e^2$ with a bar $an$ of the motor commutator that is in contact with the brush $a^2$ when the brush $d$ is leaving the bar $e^2$ as shown in Fig. 4 and the brush $k$ with the commutator bar $e^3$, the latter brush being permanently connected by the conductor $n^2$ with the bar $an^2$ of the motor commutator which bar is in contact at this time with the brush $a^3$ of the motor. In this way the abruptness of the breaking is obviated and arcing does not occur.

It is convenient to employ a transformer as described in order to obtain a required voltage but it may be omitted and the voltage of the direct current used.

By varying the speed of the motor any desired cycle may be obtained.

What I claim is:

1. The combination of a source of direct current, a circuit adapted to be energized from said source, a motor adapted to be actuated by said direct current and provided with a commutator, a commutator interposed in said circuit, the bars of the last named commutator being connected with the bars of the motor-commutator that are in contact with the motor brushes when the bars of said interposed commutator are passing out of circuit.

2. The combination of a source of direct current, a transformer adapted to be placed in circuit with said source, a motor in shunt circuit from said source, a commutator on the shaft of said motor interposed between said source and said transformer, the bars of said commutator being permanently connected with the bars of the motor commutator which are in contact with the motor brushes when the bars of the interposed commutator are passing out of circuit with said source and transformer.

3. The combination of a source of direct current, an electric motor provided with a commutator, a commutator interposed in said circuit, the bars of the last named commutator being connected with the bars of the motor-commutator that are in contact with the motor brushes when the bars of said interposed commutator are passing out of circuit.

In testimony whereof, I sign this specification.

FREDERICK D. COOLEY.